(12) United States Patent
Kweon

(10) Patent No.: US 6,651,699 B2
(45) Date of Patent: Nov. 25, 2003

(54) LINER FOR BRANCH PIPE OF OLD REPAIRED PIPE AND LINING SYSTEM AND METHOD FOR SUCH LINER

(76) Inventor: Tae-Joo Kweon, 584-1, Spagdo-Dong, Dongjack-Ku, Seoul (KR)

(*) Notice: Subject to any disclaimer, the term of this patent is extended or adjusted under 35 U.S.C. 154(b) by 0 days.

(21) Appl. No.: 10/310,789

(22) Filed: Dec. 6, 2002

(65) Prior Publication Data
US 2003/0106601 A1 Jun. 12, 2003

(30) Foreign Application Priority Data
Dec. 12, 2001 (KR) .................. 10-2001-0078628

(51) Int. Cl.[7] .................................. F16L 55/16
(52) U.S. Cl. ................. 138/98; 138/97; 264/269; 264/248; 156/294; 219/535
(58) Field of Search ............... 138/98, 97; 264/516, 264/269, 36, 248, 249; 156/287, 294, 304.2, 514; 219/617, 521, 535

(56) References Cited

U.S. PATENT DOCUMENTS

| | | | |
|---|---|---|---|
| 4,684,428 A | * 8/1987 | Ewen et al. | 156/257 |
| 4,894,521 A | * 1/1990 | Evans | 219/535 |
| 4,933,037 A | * 6/1990 | de Jong | 156/166 |
| 5,487,411 A | 1/1996 | Goncalves | 138/98 |
| 5,566,719 A | * 10/1996 | Kamiyama et al. | 138/98 |
| 5,632,952 A | * 5/1997 | Mandich | 264/516 |
| 5,708,251 A | * 1/1998 | Naveh | 219/121.66 |
| 6,006,787 A | * 12/1999 | Kamiyama et al. | 138/98 |
| 6,068,725 A | * 5/2000 | Tweedie et al. | 156/287 |
| 6,082,411 A | * 7/2000 | Ward | 138/98 |
| 6,152,184 A | * 11/2000 | Kamiyama et al. | 138/98 |
| 6,206,049 B1 | * 3/2001 | Ward | 138/98 |

* cited by examiner

*Primary Examiner*—Patrick Brinson
(74) *Attorney, Agent, or Firm*—Robert E. Bushnell, Esq.

(57) ABSTRACT

A liner for a branch pipe of an old repaired pipe lined with a polyethylene liner, the liner comprising: a branch pipe portion made of a tubular body, the branch pipe portion being insertable into an existing branch pipe branching from the old repaired pipe; a welding plate provided at a first end of the branch pipe portion, the welding plate having a top surface to be welded to an inner surface of the polyethylene liner and being formed to have a curvature corresponding the an inner surface of the old repaired pipe; at least one O-ring attached tightly to an outer circumferential surface of a second end of the branch pipe portion; an expandable pressing ring for pressing against an inner surface portion of the second end of the branch pipe portion adjacent to the O-ring to force the O-ring to form a watertight seal against the existing branch pipe; an expanding key for holding the pressing ring in an expanded position to maintain the pressure of the pressing ring against the second end of the branch pipe portion; and a heater laid closely under an upper surface portion of the welding plate, the heater being powered by an external power source so that the upper surface of the welding plate is welded to the inner surface of the polyethylene liner.

15 Claims, 7 Drawing Sheets

LINER FOR BRANCH PIPE OF OLD REPAIRED PIPE AND LINING SYSTEM AND METHOD FOR SUCH LINER

CLAIM OF PRIORITY

This application makes reference to, incorporates the same herein, and claims all benefits accruing under 35 U.S.C §119 from an application entitled Branchpipe-liner Of Revival Pipe And Its Lining System, Its Lining Method earlier filed in the Korean Industrial Property Office on Dec. 10, 2001, and there duly assigned Ser. No. 2001-76935 by that Office.

BACKGROUND OF THE INVENTION

1. Field of the Invention

The present invention relates generally to a liner for a branch pipe of an old repaired pipe lined by a polyethylene pipe, a lining system for a branch pipe of an old repaired pipe, and a lining method for a branch pipe of an old repaired pipe. More particularly, the present invention relates to a liner for a branch pipe of an old repaired pipe lined by a polyethylene pipe, a lining system for a branch pipe of an old repaired pipe, and a lining method for a branch pipe of an old repaired pipe, in which a liner is provided having a plurality of airtight rings provided at the outer circumference of the end of the branch pipe.

2. Description of the Related Art

Generally, a water-supplying pipe is made of iron. On this account, the water-supplying pipe may be corroded as time goes by. Consequently, rust stain is generated and scale is formed on the inner surface of the water-supplying pipe. As a result, there occurs a water leakage at the joint due to an abnormal pressure caused by reduction of the sectional area in which the water passes. Furthermore, there is an economical loss incurred due to the leakage of the cleaned water. For this reason, an old water-supplying pipe is replaced with a new water-supplying pipe.

On the other hand, a water-draining pipe is made of concrete. On this account, the water-draining pipe may be cracked and damaged due to frequent constructions and live load of heavy vehicles applied from the ground as time goes by. As a result, underground water may be contaminated due to the leakage of the drained water, or the drained water may be increased due to inflow of the underground water. For this reason, an old water-draining pipe is replaced with a new water-draining pipe after the ground in the vicinity of the old water-draining pipe is dug out.

As clearly understood from the above description, it costs a great deal to replace the water supplying pipe or the water draining pipe laid under the ground with a new pipe. For this reason, after corrosion and scale are removed from the interior of the old water supplying pipe or the old the water draining pipe, a tubular liner made of polyethylene is inserted into the pipe. Subsequently, the tubular liner is expanded and attached tightly to the inner wall of the pipe by means of hot steam and compressed air so that the old water supplying pipe or the old the water draining pipe is repaired with the polyethylene.

As an example of an old lining method for a pipe see U.S. Pat. No. 5,487,411 to Joseph E. F. Goncalves entitled Liner Pipe For Repair Of A Host Pipe.

In the case that an old branch pipe extends from an old repaired pipe, such as an old water supplying pipe or and old the water draining pipe repaired by the aforementioned lining method, however, it is required that the ground is dug out in order to replace the old branch pipe by a new branch pipe.

In the aforementioned water-supplying pipe, the old branch pipe is replaced by a new branch pipe after the ground is dug out. In the water-supplying pipe, however, there is usually a drilled hole formed at the branch pipe extending from a house, for example, and it is left as it is after the old water-draining pipe is repaired by such a lining method. Consequently, there occurs a leakage of water from between the repaired pipe and the liner.

Hence, it is required that the ground in the vicinity of the branch pipe is dug out after the old water supplying pipe or the old the water draining pipe is repaired by the polyethylene lining method as mentioned above, a liner for the branch pipe is then inserted into the branch pipe from the inside of the repaired pipe, and then the end of the branch pipe is formed with a flange in order to repair the branch pipe.

If the ground in the vicinity of the branch pipe is dug out in order to repair the branch pipe as mentioned above, traffic may be paralyzed terribly in the vicinity of the branch pipe to be repaired. Of course, a night work for repairing the branch pipe may be considered in order to avoid such a traffic problem. If the branch pipe is repaired at night, however, there may be a lot of increased risk of an accident and the efficiency of the repairing work may be decreased.

SUMMARY OF THE INVENTION

The present invention is disclosed in order to overcome the afore mentioned drawbacks of the prior art.

Accordingly, it is an object of the present invention to provide a liner for a branch pipe of an old repaired pipe lined by a polyethylene pipe.

It is another object of the present invention to provide a lining system for a branch pipe of an old repaired pipe.

It is yet another object of the present invention to provide a lining method for a branch pipe of an old repaired pipe.

To achieve the above objects, a liner for a branch pipe with a plurality of airtight rings provided at the outer circumference of the end of the branch pipe is provided, the liner for the branch pipe is inserted into the branch pipe from below through a branch pipe hole, which is formed by drilling, the end of the branch pipe is attached tightly to the inner wall of the existing branch pipe so that the any leakage of water, between the old repaired pipe with the branch pipe hole formed by drilling and the liner made of polyethylene, can be prevented by means of a lining work of the branch pipe, the lining work of the branch pipe being completed quickly and easily without any excavation work at the road surface in the vicinity of the branch pipe.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A liner for a branch pipe of an old repaired pipe, a lining system for a branch pipe of an old repaired pipe, and a lining method for a branch pipe of an old repaired pipe according to the present invention will now be described in detail with reference to the accompanying drawings.

The present invention is provided for completing a lining work of the branch pipe without digging out the ground in the vicinity of the branch pipe when the branch pipe formed at the old repaired pipe is repaired by the lining method.

Figure 1:
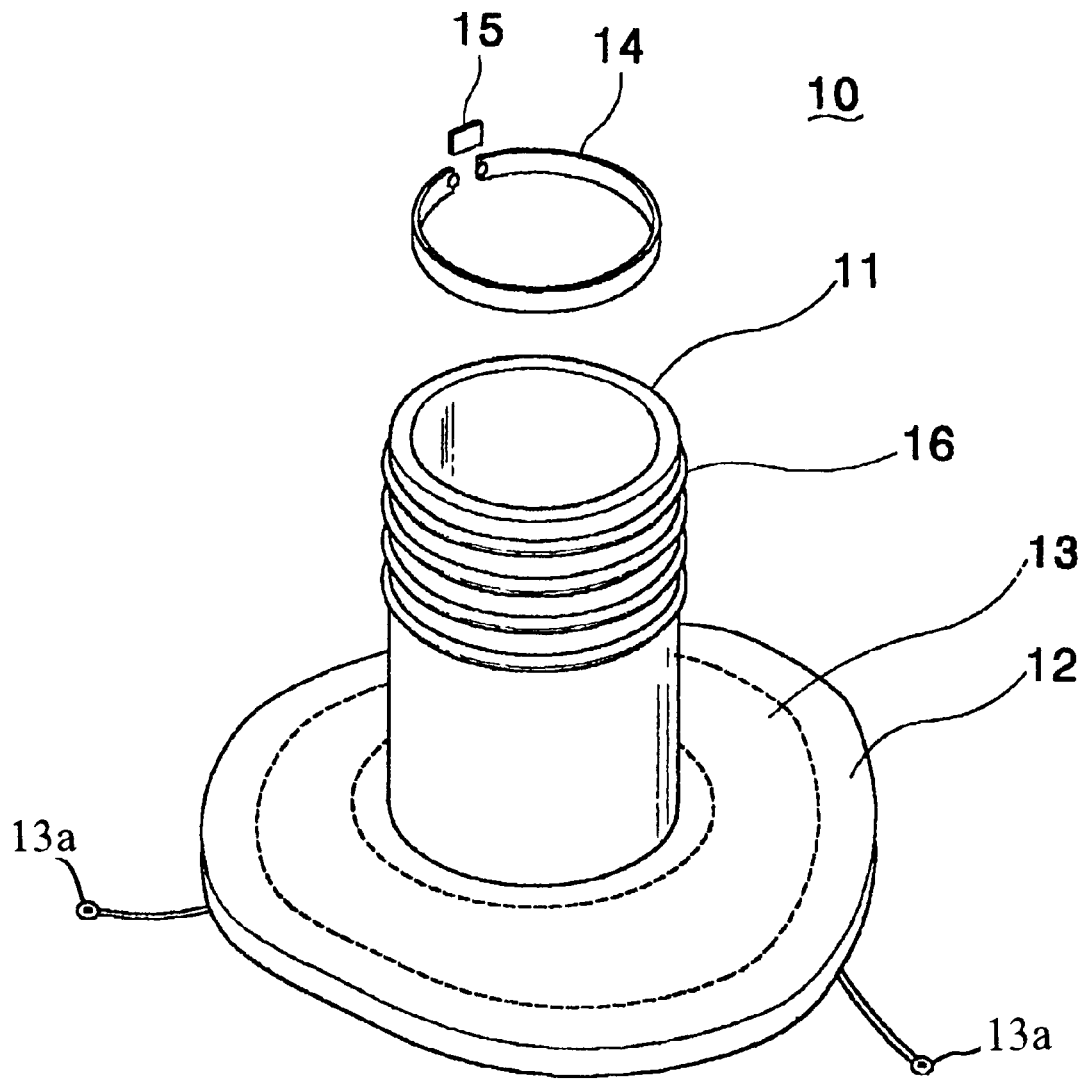
FIG. 1 is a perspective view of a preferred embodiment of a liner for a branch pipe of an old repaired pipe according to the present invention.
Figure 3:
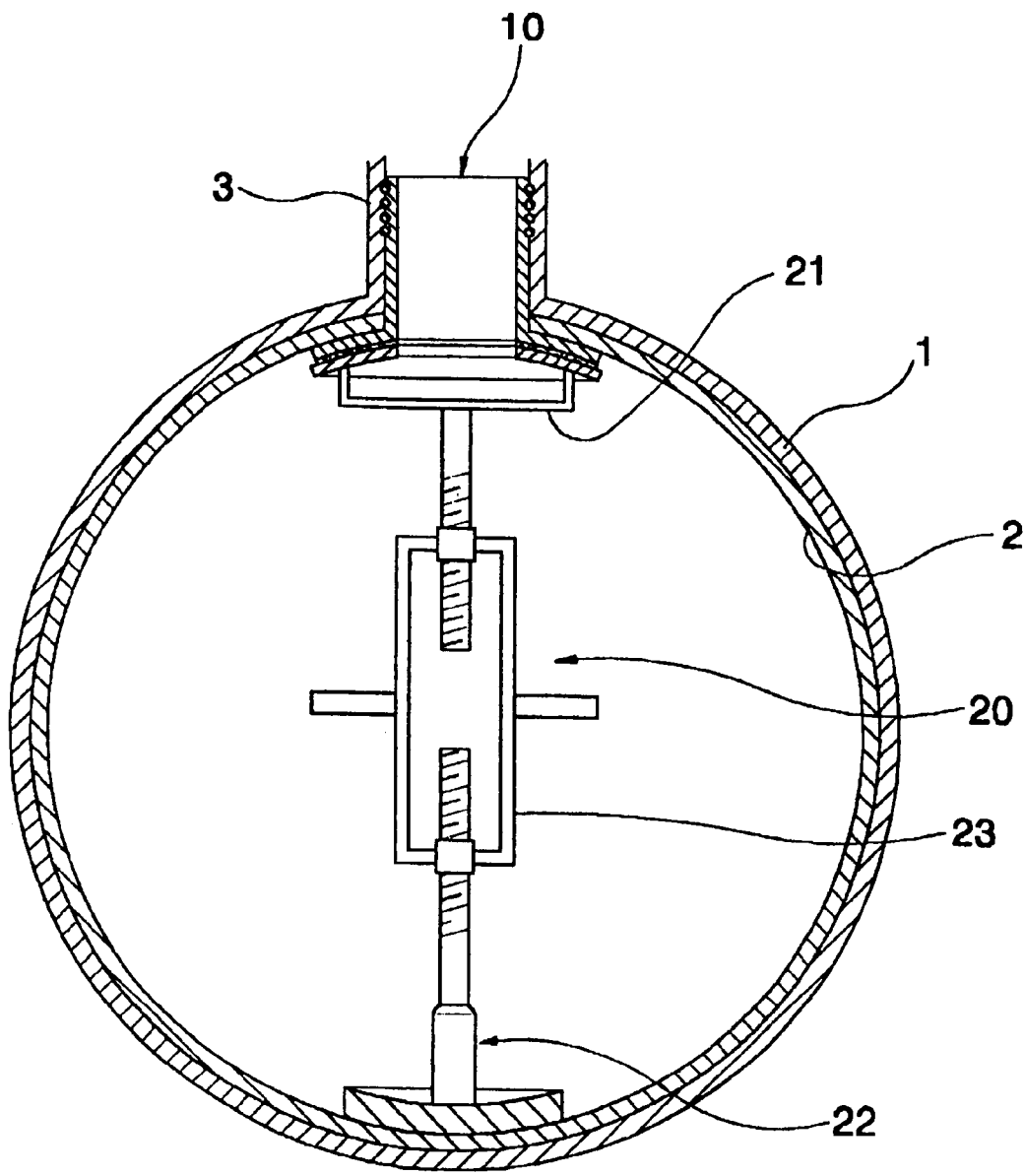
FIG. 3 is a side view showing the state that the supporting means according a preferred embodiment of the present invention is used.

As illustrated in FIGS. 1 and 3, a liner 10 for a branch pipe of an old repaired pipe (hereafter: main pipe) according to the present invention comprises a branch pipe portion 11 made of a tubular body, the branch pipe portion 11 being inserted into an existing branch pipe 3 (FIG. 3) from the main pipe 1 (FIG. 3); a welding plate 12 provided at the lower end of the branch pipe portion 11, the welding plate 12 having a top surface welded to the inner surface of a main pipe liner 2 and being formed of the same curvature as that of the main pipe 1; an pressing ring 14 for pressing the branch pipe portion 11 against the existing branch pipe 3 at the inner end of the branch pipe portion 11; an expanding key 15 for expanding the pressing ring 14; one or more O-rings 16 pressed tightly to the inner surface of the existing branch pipe 3 by means of the pressing ring 14 and expanding key 15 in such a manner that a water tight seal is maintained between the existing branch pipe 3 and the branch pipe portion 11 of liner 10; and a heater 13 laid closely under the upper surface of the welding plate 12 and having electric leads 13a for receiving electricity to heat heater 13 so that the upper surface of the welding plate 12 is welded to the inner wall of the main pipe liner 2 by means of an external power source.

In a preferred embodiment of the present invention, the O-ring 16 may be made of a material capable of expanding by water.

Figure 2:
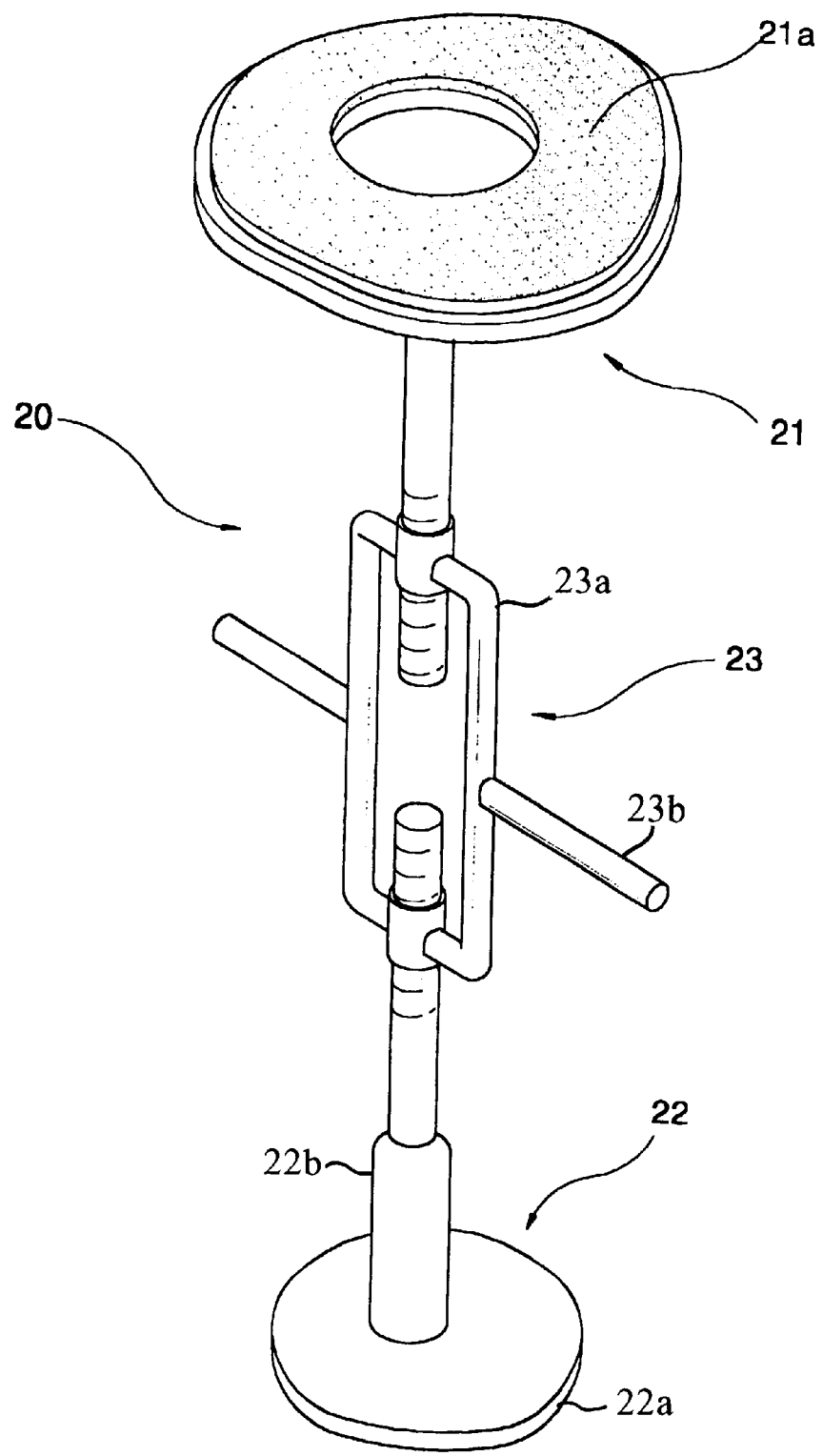
FIG. 2 is a perspective view of a preferred embodiment of supporting means according to the present invention.

FIG. 2 illustrates a mounting system for mounting the aforementioned liner 10 for the branch pipe. The mounting system comprises supporting means 20 for supporting the welding plate 12 of the liner 10 for a branch pipe so that the welding plate 12 can be welded firmly around a branch pipe hole.

Here, the supporting means 20 is provided at one end thereof with a branch supporting portion 21 for supporting the lower part (surface) of the welding plate 12 of the liner 10 for the branch pipe, is provided at the other end thereof with a main supporting portion 22 for supporting the inner wall of the main pipe 1, and is provided at the center thereof with a lifting actuator 23.

On the upper surface of the branch supporting portion 21 is provided a shock-absorbing pad 21a made of rubber for absorbing shock applied to the branch supporting portion 21.

Figure 4:
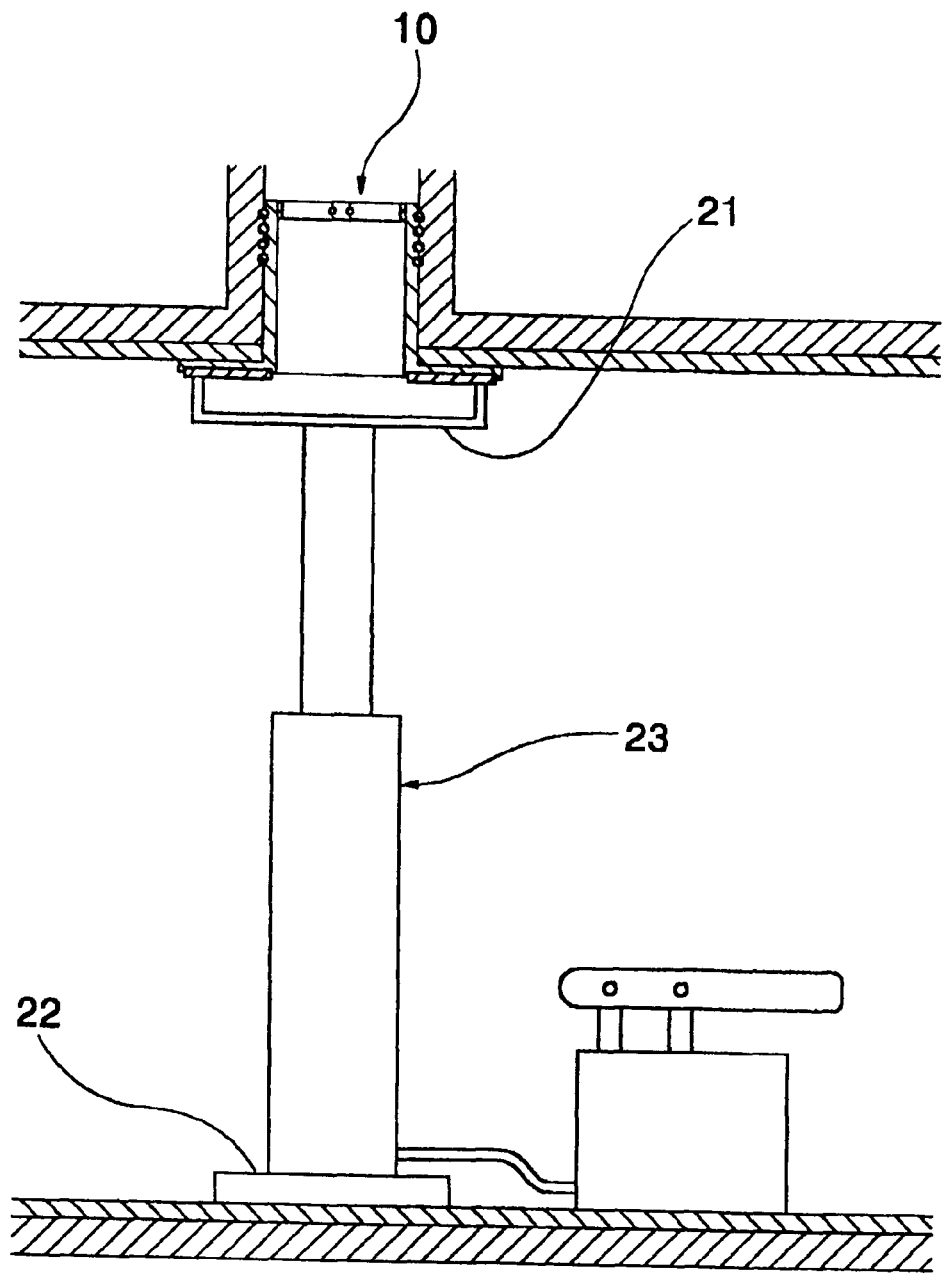
FIG. 4 is a side view of another preferred embodiment of supporting means according to the present invention.

The lifting actuator 23 may be a cylinder type actuator (see FIG. 4) to which actuating fluid is supplied from a separated pump or a screw type actuator (FIG. 2) comprising a turnbuckle 23a provided between the branch supporting portion 21 and the main supporting portion 22 and a rotating handle 23b for rotating the turnbuckle 23a. Here, the main supporting portion includes a plate 22a having a curvature corresponding to a curvature of an inner surface of the main pipe and a threaded portion 22b engaging the turnbuckle 23a.

Figure 5:
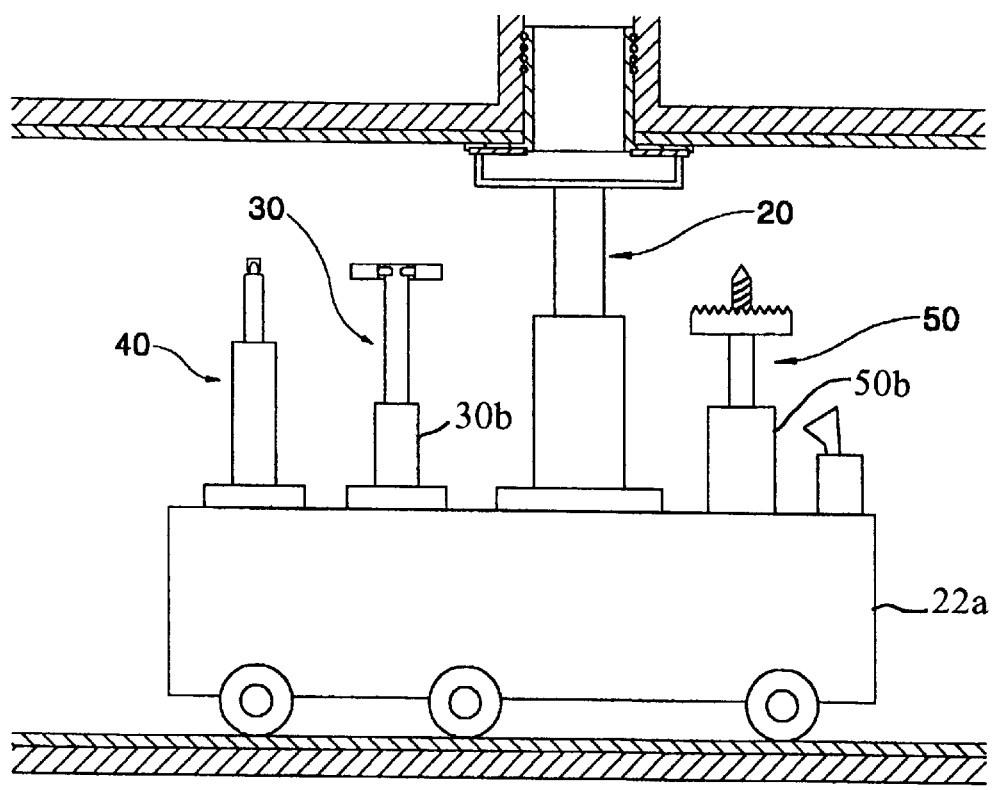
FIG. 5 is a side view of still another preferred embodiment of supporting means according to the present invention.

FIG. 5 illustrates a ring expanding means 30 for expanding pressing ring 14 of the liner 10 for the branch pipe so that a expanding key 15 can be inserted into the pressing ring 14.

Figure 6:
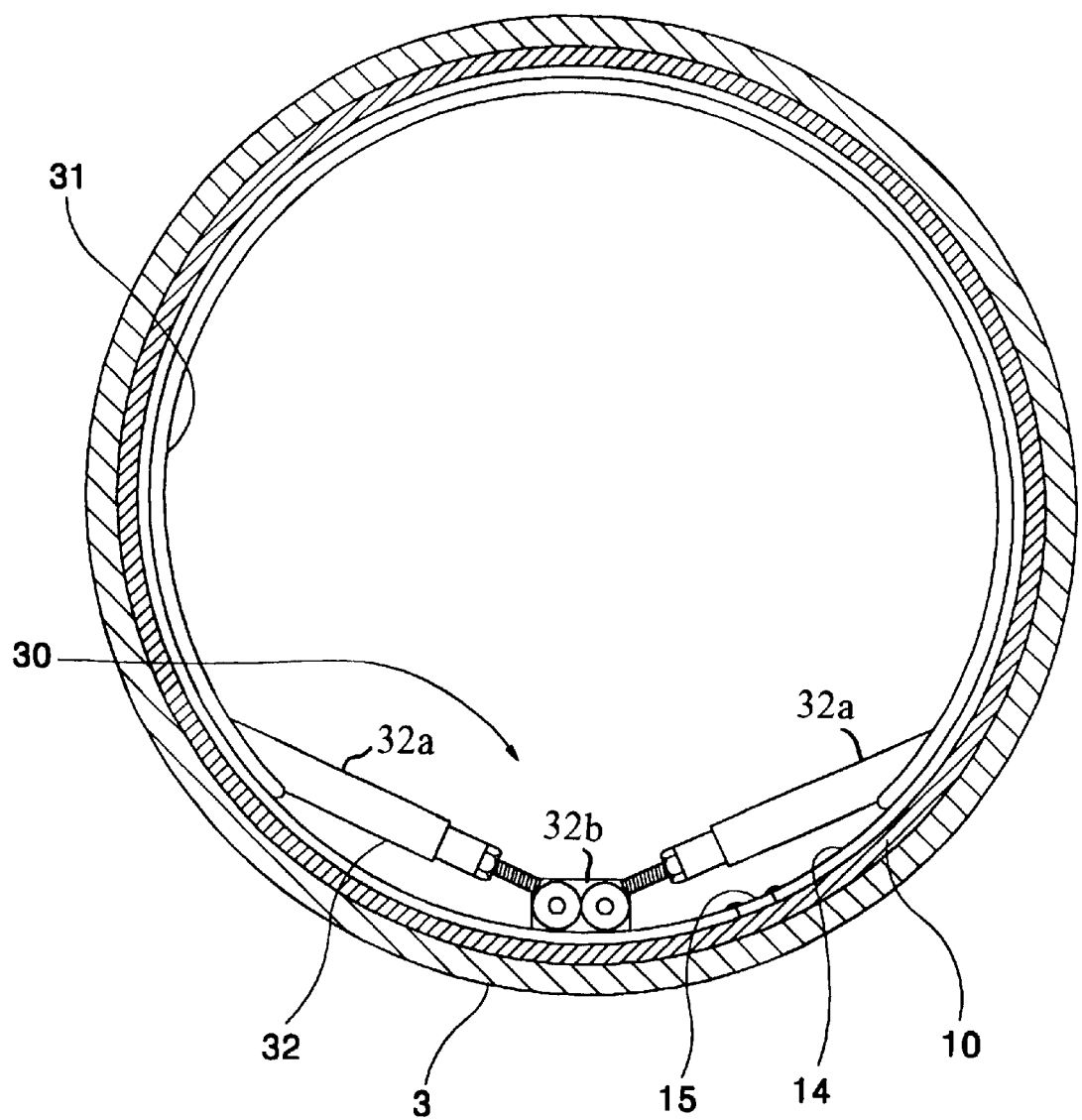
FIG. 6 is a top plan view of a preferred embodiment of ring expanding means according to the present invention.

FIG. 6 illustrates, in more detail, the ring expanding means 30. The ring expanding means 30 comprises a ring expanding portion 31 for expanding the pressing ring 14, and an expanding actuator 32 for expanding the opening of the ring expanding portion 31. The expanding actuator 32 comprises expanding actuators 32a provided at either end of the ring expanding portion 31, and a supporting portion 32b placed on the pressing ring 14. The expanding actuators 32a are connected to each other by means of the supporting portion 32b. The expanding actuators 32a maybe a cylinder type actuator to which actuating fluid is supplied from a separated pump or a screw type actuator made of a screw engaging structure.

In a preferred embodiment of the present invention, the main supporting portion 22 of the supporting means 20 may be made in the form of a moving body 22a, as shown in FIG. 5, which can move along the main pipe 1, so that the lining operation of the branch pipe can be carried out by an unmanned work.

The moving body 22a includes drilling means 50 capable of being lifted by a hydraulic lifting means 50b for drilling a branch pipe hole at the branch position of the existing branch pipe 3; ring expanding means 30 capable of being lifted by a hydraulic lifter 30b for expanding the pressing ring 14 against the branch pipe portion 11 of the liner 10 for the branch pipe; and key inserting means 40 for inserting an expanding key 15 into the pressing ring 14 expanded by means of the ring expanding means 30.

Figure 7:
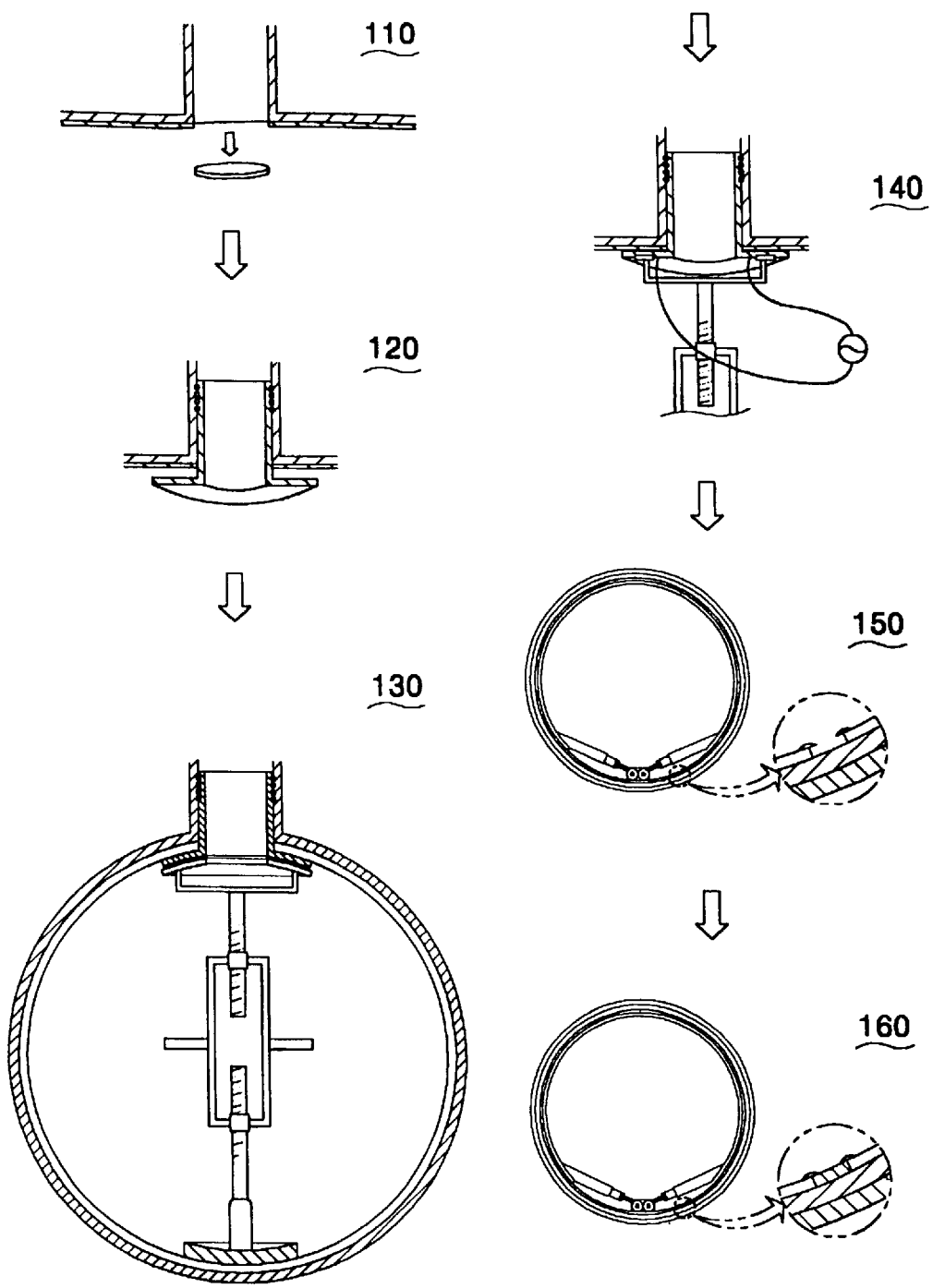
FIG. 7 is a flow diagram showing a lining method for a branch pipe of an old repaired pipe according to the present invention.

Referring now to FIG. 7, a mounting method for mounting the aforementioned liner 10 for the branch pipe comprises: a drilling step 110 for drilling a branch pipe hole, having a diameter identical to that of an existing branch pipe 3, through main pipe liner 2 placed at the bottom of the existing branch pipe 3; a liner inserting step 120 for lifting a branch supporting portion 21 and inserting the branch pipe portion 11 of the liner 10 and the O-ring 16 through the branch pipe hole drilled by the drilling step 110; a branch pipe supporting step 130 for supporting the lower part of welding plate 12 of the liner 10 for the branch pipe inserted into the existing branch pipe 3 by the liner inserting step 120; a liner welding step 140 for welding the upper surface of a welding plate 12 provided at the lower end of the liner 10 of the branch pipe to the inner wall of the liner 2 by supplying electric power to leads 13a of the heater 13 laid closely under the upper surface of the welding plate 12 after the liner 10 for the branch pipe is supported by the branch pipe supporting step 130; a ring expanding step 150 for expanding pressing ring 14 inserted into the distal end of the liner 10 adjacent to O-ring 16 and expanding the pressing ring 14 by ring expanding means 30 after the welding plate 12 is welded to the inner wall of the mail pipe liner 2 by the liner welding step 140; and a key inserting step 160 for inserting the expanding key 15 into the opening of the pressing ring 14 expanded by the ring expanding step 150.

The operation of the present invention will now be described.

In case that a lining work is carried out to the existing branch pipe 3 using the liner 10 for the branch pipe having the welding plate 12 provided at the lower end thereof and the branch pipe portion 11 attached tightly to the existing branch pipe 3 by means of the pressing ring 14 according to the present invention, as mentioned above, the branch pipe hole having a diameter identical to that of the branch pipe 3 is drilled through the main pipe liner 2 placed at the bottom of the branch pipe by the branch pipe hole drilling step 110.

Next, the liner 10 for the branch pipe is inserted into the branch pipe 3 from below through the branch pipe hole, which has been formed by the branch pipe hole drilling step 110, by the liner inserting step 120. After that, the liner 10 for the branch pipe inserted into the existing branch pipe 3 is supported closely to the inner wall of the main pipe liner 2 of the main pipe 1 by the branch pipe supporting step 130.

And then, the welding plate 12 is welded to the liner 2 of the main pipe 1 by supplying an electrical power to the leads 13a of the heater 13 provided at the welding plate 12 during the liner welding step 140.

After the welding step has been completed, the pressing ring 14 is inserted into the inner distal end of the tubular branch pipe portion 11, and pressing ring 14 is expanded by the ring expanding means 30 according to the ring expanding step 150.

Finally, during the key inserting step 160, the expanding key 15 is inserted into the opening of the pressing ring 14 expanded by the ring expanding step 150. Consequently, the mounting of the liner 10 for the branch pipe can be completed quickly and easily without any excavation work at the road surface in the vicinity of the existing branch pipe 3.

According to the present invention, the lower end of the liner for the branch pipe is welded to the liner of the main pipe when the liner for the branch pipe is inserted into the existing branch pipe, and an upper end of the branch pipe liner is expanded and pressed tightly to the inner wall of the branch pipe by means of the pressing ring and O-ring, so that the lining work of the branch pipe can be completed quickly and easily without any excavation work at the road surface in the vicinity of the branch pipe, and no traffic is paralyzed in the vicinity of the branch pipe to be repaired Furthermore, work for repairing the branch pipe is possible during the day or night since the work is carried out from the inside of the main pipe, thus ground in the vicinity of the branch pipe is not dug out in order to repair the branch pipe. As a result, work efficiency and stability can be improved.

Although the invention has been described in its preferred embodiment form with a certain degree of particularity, it is understood that the present disclosure of the preferred form has been changed in the details of construction and the combination and arrangement of parts may be resorted to without departing the spirit and the scope of the invention as hereinafter claimed.

What is claimed is:

1. A liner for a branch pipe of an old repaired pipe lined with a polyethylene liner, said liner comprising:
   a branch pipe portion made of a tubular body, the branch pipe portion being insertable into an existing branch pipe branching from said old repaired pipe;
   a welding plate provided at a first end of the branch pipe portion, the welding plate having a top surface to be welded to an inner surface of said polyethylene liner and being formed to have a curvature corresponding the an inner surface of the old repaired pipe;
   at least one O-ring attached tightly to an outer circumferential surface of a second end of the branch pipe portion;
   an expandable pressing ring for pressing against an inner surface portion of said second end of the branch pipe portion adjacent to said O-ring to force said O-ring to form a watertight seal against the existing branch pipe;
   an expanding key for holding the pressing ring in an expanded position to maintain the pressure of the pressing ring against the second end of the branch pipe portion; and
   a heater laid closely under an upper surface portion of the welding plate, said heater being powered by an external power source so that the upper surface of the welding plate is welded to said inner surface of said polyethylene liner.

2. A lining system for lining an existing branch pipe branching from of an old repaired pipe lined with a polyethylene liner, said lining system comprising:
   a branch pipe liner having a tubular body, the tubular body being insertable into said existing branch pipe;
   a welding plate extending from a first end of the tubular body, the welding plate having a top surface to be welded to an inner surface of said polyethylene liner and being formed to have a curvature corresponding the an inner surface of the old repaired pipe;
   at least one O-ring attached tightly to an outer circumferential surface of a second end of the tubular body;
   an expandable pressing ring for pressing against an inner surface portion of said second end of the tubular body adjacent to said O-ring to force said O-ring to form a watertight seal against the existing branch pipe;
   an expanding key for holding the pressing ring in an expanded position to maintain the pressure of the pressing ring against the second end of the tubular body; and
   a heater laid closely under an upper surface portion of the welding plate, said heater being powered by an external power source so that the upper surface of the welding plate is welded to said inner surface of said polyethylene liner.

3. The lining system as set forth in claim 2, further comprising:
   supporting means for supporting said welding plate in a close relationship with said inner surface of said polyethylene liner;
   ring expanding means for expanding said pressing ring; and
   key insertion means for inserting said expanding key into a gap formed in said pressing ring when said pressing ring is expanded by said ring expanding means.

4. The lining system as set forth in claim 3, said supporting means comprising:
   a first support having a padded surface area on which a bottom surface portion of said welding plate is supported;
   an actuator for raising said first support to enable said upper surface portion of said welding plate to press against inner surface of said polyethylene liner; and
   a second support for supporting said actuator.

5. The lining system as set forth in claim 4, said actuator comprising a hydraulic lift.

6. The lining system as set forth in claim 4, said actuator comprising a turnbuckle and handles for turning said turnbuckle.

7. The lining system as set forth in claim 4, said second support comprising a movable body movable along an inner portion of said old repaired pipe.

8. The lining system as set forth in claim 7, said movable body supporting said ring expanding means for expanding said pressing ring and said key insertion means.

9. The lining system as set forth in claim 2, further comprising a drill for drilling a hole, having a diameter identical to that of said existing branch pipe, through said polyethylene liner through which said tubular body is inserted into said existing branch pipe.

10. The lining system as set forth in claim 8, further comprising a drill supported by said movable body, said drill drilling a hole through said polyethylene liner through which said tubular body is inserted into said existing branch pipe.

11. The lining system as set forth in claim 6, said second support comprising:

a plate having a curvature corresponding to a curvature of an inner surface of said old repaired pipe; and a threaded portion engaging said turnbuckle.

12. The lining system as set forth in claim 3, said ring expanding means comprising:

a ring expanding portion engaging the pressing ring;

a pair of expanding actuators for expanding an opening in the ring expanding portion causing said pressing ring to expand to form said gap;

and an expanding actuator support means for connecting said expanding actuators to each other, said expanding actuator support means being disposed in contact with said pressing ring.

13. A lining method for lining an existing branch pipe branching from of a main pipe lined with a polyethylene liner, said method comprising steps of:

drilling a branch pipe hole, having a diameter identical to that of said existing branch pipe, through said polyethylene liner;

inserting a branch pipe liner through the branch pipe hole and into the branch pipe, said branch pipe liner having a first end having a tubular shape and a second end from which a welding plate extends, said tubular shape having a diameter similar to the diameter of said existing branch pipe and said welding plate having a shape larger than said diameter of said tubular shape, the shape of the welding plate conforming to a shape of an inner surface portion of said main pipe;

supporting the lower part of said welding plate to press an upper surface of said welding plate against said polyethylene liner; and heating a heater disposed beneath said upper surface of said welding plate to weld the upper surface of said welding plate to an inner wall of the polyethylene liner.

14. The method as set forth in claim 13, said heating step including a step of supplying electric power to leads extending from said heater.

15. The method as set forth in claim 13, further comprising steps of:

inserting a pressing ring into said first end of the branch pipe liner after the welding plate is welded to the inner wall of the polyethylene liner;

expanding the pressing ring by a ring expanding means, the expansion of said pressing ring causing an O-ring, formed around an outer surface portion of said tubular body, to press against said existing branch pipe to form a watertight seal; and inserting an expanding key into a gap formed in said expanding ring expanded during said expanding step to hold said pressing ring in its expanded position.

* * * * *